United States Patent
You et al.

(10) Patent No.: US 9,923,674 B2
(45) Date of Patent: Mar. 20, 2018

(54) METHOD FOR TRANSMITTING AND RECEIVING UPLINK/DOWNLINK DATA WITH MTC DEVICE

(71) Applicant: LG ELECTRONICS INC., Seoul (KR)

(72) Inventors: Hyangsun You, Seoul (KR); Bonghoe Kim, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 15/022,854

(22) PCT Filed: Oct. 7, 2014

(86) PCT No.: PCT/KR2014/009421
§ 371 (c)(1),
(2) Date: Mar. 17, 2016

(87) PCT Pub. No.: WO2015/060564
PCT Pub. Date: Apr. 30, 2015

(65) Prior Publication Data
US 2016/0211949 A1    Jul. 21, 2016

Related U.S. Application Data

(60) Provisional application No. 61/894,938, filed on Oct. 24, 2013.

(51) Int. Cl.
*H04L 1/18* (2006.01)
*H04W 4/00* (2018.01)
*H04W 72/04* (2009.01)

(52) U.S. Cl.
CPC ............ *H04L 1/1861* (2013.01); *H04L 1/189* (2013.01); *H04W 4/005* (2013.01); *H04W 72/042* (2013.01); *H04L 1/1896* (2013.01)

(58) Field of Classification Search
CPC ........ H04L 1/08; H04L 1/1861; H04L 1/1864; H04L 1/1867; H04L 1/189; H04L 1/1896;
(Continued)

(56) References Cited

U.S. PATENT DOCUMENTS

2014/0362832 A1* 12/2014 Rudolf ................ H04L 1/1822
370/336

OTHER PUBLICATIONS

Huawei et al, "Further discussion on coverage improvement for the data channels", 3GPP TSG RAN WG1 Meeting #74, R1-133513, Barcelona, Spain, Aug. 19-23, 2013.*
(Continued)

*Primary Examiner* — Khoa Huynh
(74) *Attorney, Agent, or Firm* — Birch, Stewart, Kolasch & Birch, LLP

(57) ABSTRACT

A method is provided for transmitting uplink data. The method is performed by a machine type communication (MTC) device that transmits initially a bundle of repeated physical uplink shared channels (PUSCHs) including same uplink data to a base station on a plurality of uplink subframes, receives a hybrid automatic repeat request (HARQ) response signal from the base station in response to the bundle of repeated PUSCHs, receives an indication of a physical downlink shared channel (PDSCH) repetition number from the base station, determines a repetition number of a PUSCH including the same uplink data based on the indication, when the HARQ response signal is a negative-acknowledgement (NACK), and retransmits the bundle of repeated PUSCHs according to the determined repetition number of the PUSCH on the plurality of uplink subframes, to the base station. The indication is included in a modulation and coding scheme (MCS) field of a physical downlink control channel (PDCCH).

10 Claims, 24 Drawing Sheets

(58) Field of Classification Search
CPC ............. H04W 4/005; H04W 72/0413; H04W 72/042; H04W 72/12; H04W 72/1284; H04W 72/1289
See application file for complete search history.

(56) References Cited

OTHER PUBLICATIONS

Motorola Mobility, "Downlink data transmission for coverage enhancement in MTC UE", 7.2.4.4, 3GPP TSG-RAN WG1 meeting #72bis, R1-131518, Chicago, USA, Apr. 15-19, 2013.*

Huawei, Hisilicon, "Further discussion on coverage improvement for the data channels", 3GPP TSG RAN WG1 Meeting #74, R1-133513, Barcelona, Spain, (Aug. 19-23, 2013).

Intel Corporation, "Coverage enhancement of DL/UL control channels for low cost MTC", 7.2.2.2.4, 3GPP TSG-RAN WG1 #74bis, R1-134131, Guangzhou, China, Oct. 7-11, 2013.

Mediatek Inc., "Coverage Analysis of PUSCH and Enhancement Techniques for MTC UEs", 7.2.4.4, 3GPP TSG-RAN WG1 #72bis, R1-131181, Chicago, USA, Apr. 14-19, 2013.

Qualcomm, "Text proposal for Small Cells for Low Cost MTC Coverage Improvement", 7.2.4.3, 3GPP TSG RAN WG1 Meeting #72bis, R1-131826, Chicago, USA, Apr. 15-19, 2013.

* cited by examiner

FIG. 6
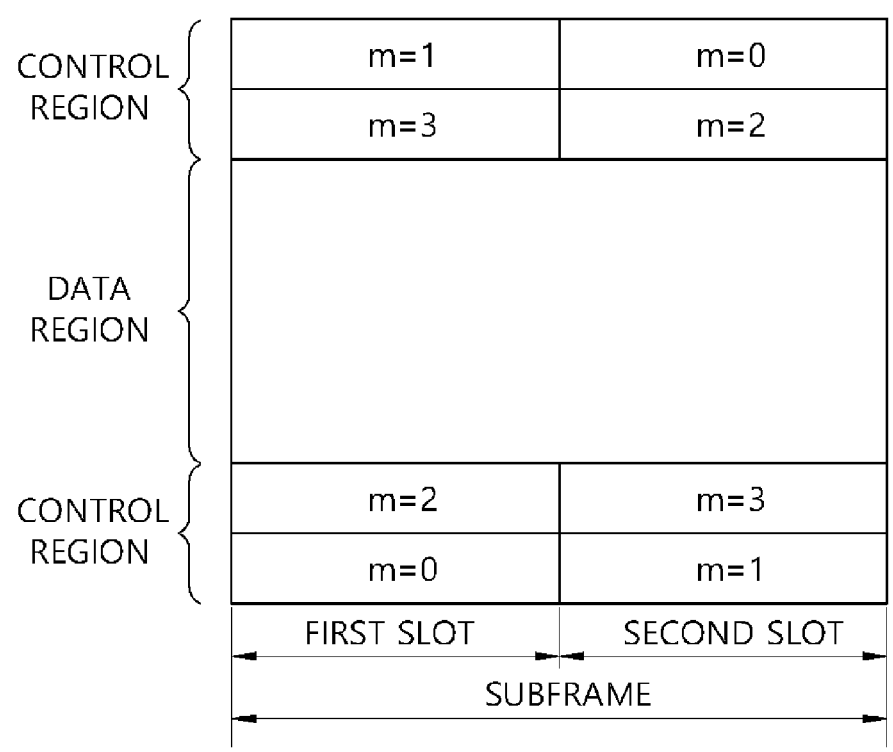
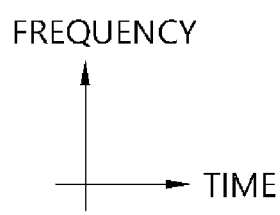

METHOD FOR TRANSMITTING AND RECEIVING UPLINK/DOWNLINK DATA WITH MTC DEVICE

CROSS REFERENCE TO RELATED APPLICATIONS

This application is the National Phase of PCT International Application No. PCT/KR2014/009421, filed on Oct. 7, 2014, which claims priority under 35 U.S.C. 119(e) to U.S. Provisional Application No. 61/894,938, filed on Oct. 24, 2013, all of which are hereby expressly incorporated by reference into the present application.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

Recently, it is considered to extend cell coverage of a BS for an MTC apparatus, and various schemes for extending the cell coverage are under discussion. However, when the cell coverage is extended, if the BS transmits a channel to the MTC apparatus located in the coverage extension region as if transmitting a channel to a normal UE, the MTC apparatus has a difficulty in receiving the channel.

Further, as the MTC apparatus is expected to have low performance in order to supply more MTC apparatuses at a low price, if the BS transmits a PDCCH or a PDSCH to the MTC apparatus located in the coverage extension region as if transmitting a PDCCH or a PDSCH to a normal UE, the MTC apparatus has a difficulty in receiving the PDCCH or the PDSCH.

SUMMARY OF THE INVENTION

Accordingly, the disclosure of the specification has been made in an effort to solve the problem.

In order to accomplish the object described above, when a machine type communication (MTC) type device is located in a coverage extension area of a BS, it may be implemented for the BS to repeatedly transmit (i.e., bundle transmission) a PDCCH or a PDSCH on several subframes.

However, although the PDCCH or the PDSCH is repeatedly transmitted (i.e., bundle transmission) on several subframes, in case that a hybrid automatic repeat request (HARQ) negative-acknowledgement (NACK) is received from a receiving side, it is technically obscure how to perform a retransmission.

To achieve the aforementioned aim, one disclosure of the present specification provides a method for transmitting uplink data device. The method may beperformed by a machine type communication (MTC) and comprise: transmitting initially a bundle of repeated physical uplink shared channels (PUSCHs) including same uplink data to a base station on a plurality of uplink subframes; receiving a hybrid automatic repeat request (HARQ) response signal from the base station in response to the bundle of repeated PUSCHs; determining a repetition number of PUSCH including the same uplink data, if the HARQ response signal is negative-acknowledgement (NACK); and retransmitting the bundle of PUSCHs, which are repeated by the determined repetition number on a plurality of uplink subframes, to the base station.

The repetition number of the PUSCH which is determined may be different from the number of bundle of repeated PUSCHs which is initially transmitted. The repetition number of the PUSCH which is determined may be less than the number of bundle of repeated PUSCHs which is initially transmitted. The repetition number of PUSCH which is determined is decreased by a half whenever NACK may be received.

The repetition number of the PUSCH may be determined according to a specific pattern.

The method may further comprising: receiving information on the repetition number of PUSCH from the base station. The information on the repetition number of PUSCH may be included in a redundancy version field in a PDCCH.

To achieve the aforementioned aim, one disclosure of the present specification provides a method for transmitting downlink data to a machine type communication (MTC) device. The method may be performed by from a base station and comprise: transmitting initially a bundle of repeated physical downlink shared channels (PDSCHs) including same downlink data to a base station on a plurality of downlink subframes; receiving a hybrid automatic repeat request (HARQ) response signal from the MTC device in response to the bundle of repeated PDSCHs; determining a repetition number of PDSCH including the same downlink data, if the HARQ response signal is negative-acknowledgement (NACK); and retransmitting the bundle of PDSCHs, which are repeated by the determined repetition number on a plurality of downlink subframes, to the MTC device.

The repetition number of the PDSCH which is determined may different from the number of bundle of repeated PDSCHs which is initially transmitted. The repetition number of the PDSCH which is determined may be less than the number of bundle of repeated PDSCHs which is initially transmitted. The repetition number of PDSCH which is determined may be decreased by a half whenever NACK is received.

The repetition number of the PDSCH may be determined according to a specific pattern.

To achieve the aforementioned aim, one disclosure of the present specification provides a machine type communication (MTC) device. The MTC may comprise: a RF transmitting and receiving unit; and a processor configured to: transmit initially a bundle of repeated physical uplink shared channels (PUSCHs) including same uplink data to a base station on a plurality of uplink subframes through the RF transmitting and receiving unit, and then, in case of receiving a hybrid automatic repeat request (HARQ) negative-acknowledgement (NACK) from the base station in response to the bundle of repeated PUSCHs, determine a repetition number of PUSCH including the same uplink data. The RF transmitting and receiving unit may retransmit the bundle of PUSCHs, which are repeated by the determined repetition number on a plurality of uplink subframes, to the base station by a control of the processor.

To achieve the aforementioned aim, one disclosure of the present specification provides a base station transmitting downlink data to a machine type communication (MTC) device. The base station may comprise: a RF transmitting and receiving unit; and a processor configured to: transmit initially a bundle of repeated physical downlink shared channels (PDSCHs) including same downlink data to the MTC device on a plurality of downlink subframes through the RF transmitting and receiving unit, and then, in case of receiving a hybrid automatic repeat request (HARQ) negative-acknowledgement (NACK) from the MTC device in response to the bundle of repeated PDSCHs, determine a repetition number of PDSCH including the same downlink data. The RF transmitting and receiving unit may retransmit the bundle of PDSCHs, which are repeated by the determined repetition number on a plurality of downlink subframes, to the MTC device by a control of the processor.

Advantageous Effects

According to a disclosure of the present invention, the problem of the related art described above will be solved. In more particularly, according to a disclosure of the present invention, a reception performance and a decoding performance of a machine type communication (MTC) device located on a coverage extension area of a BS are improved.

BRIEF DESCRIPTION OF THE DRAWINGS

FIG. 6 shows a structure of an uplink subframe in 3GPP LTE.

DESCRIPTION OF EXEMPLARY EMBODIMENTS

Figure 1:
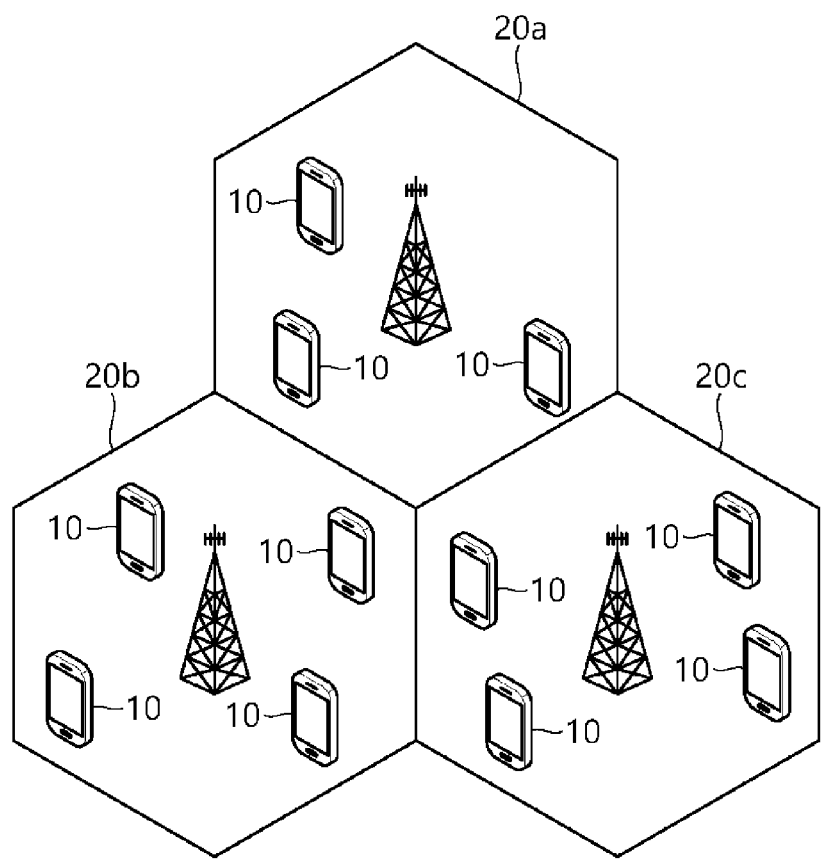
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
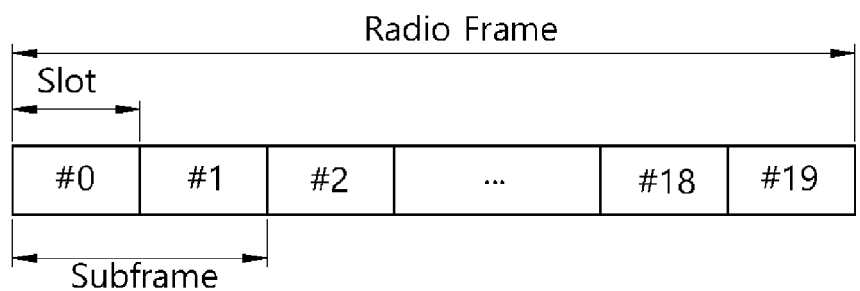
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
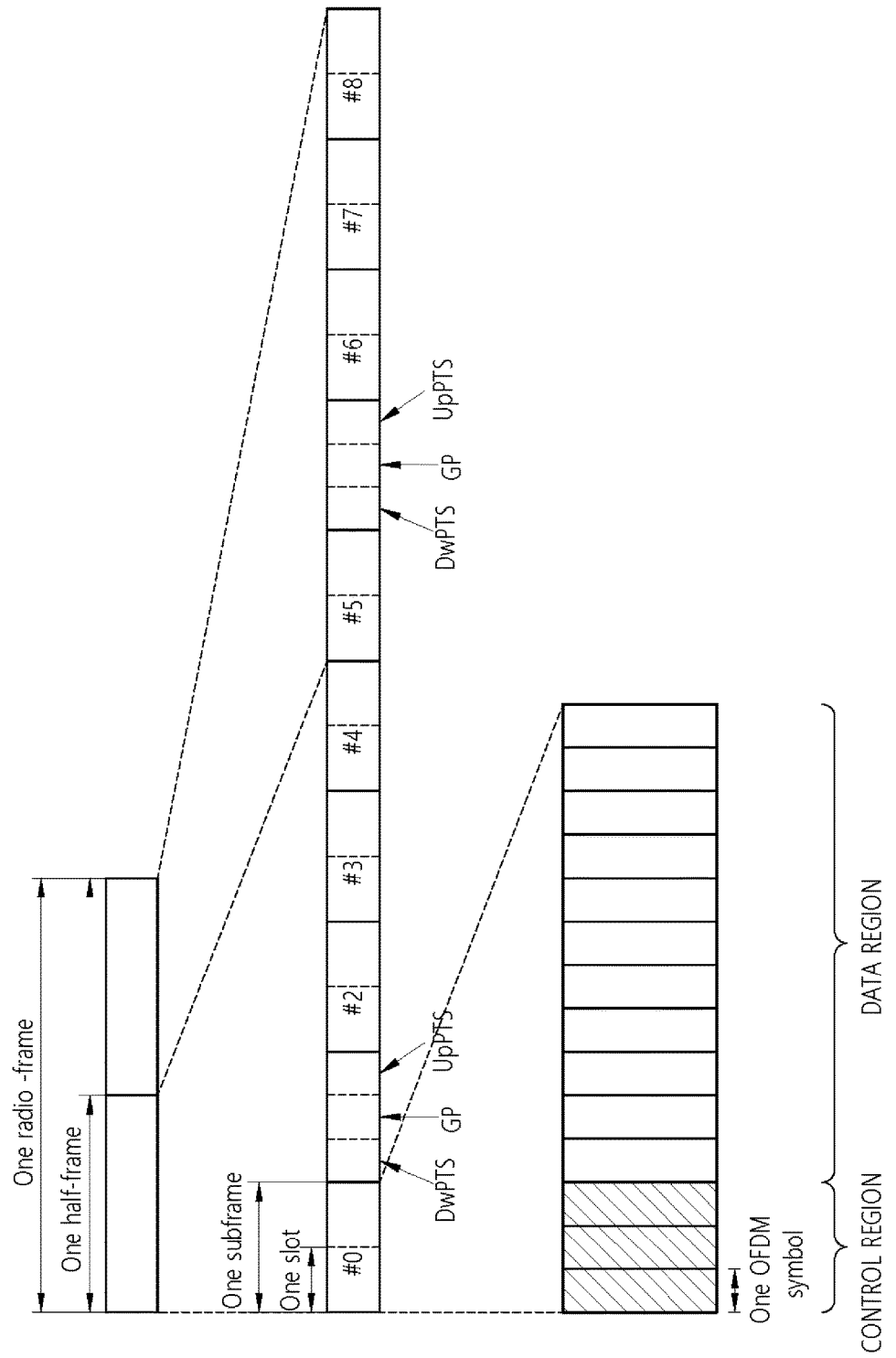
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
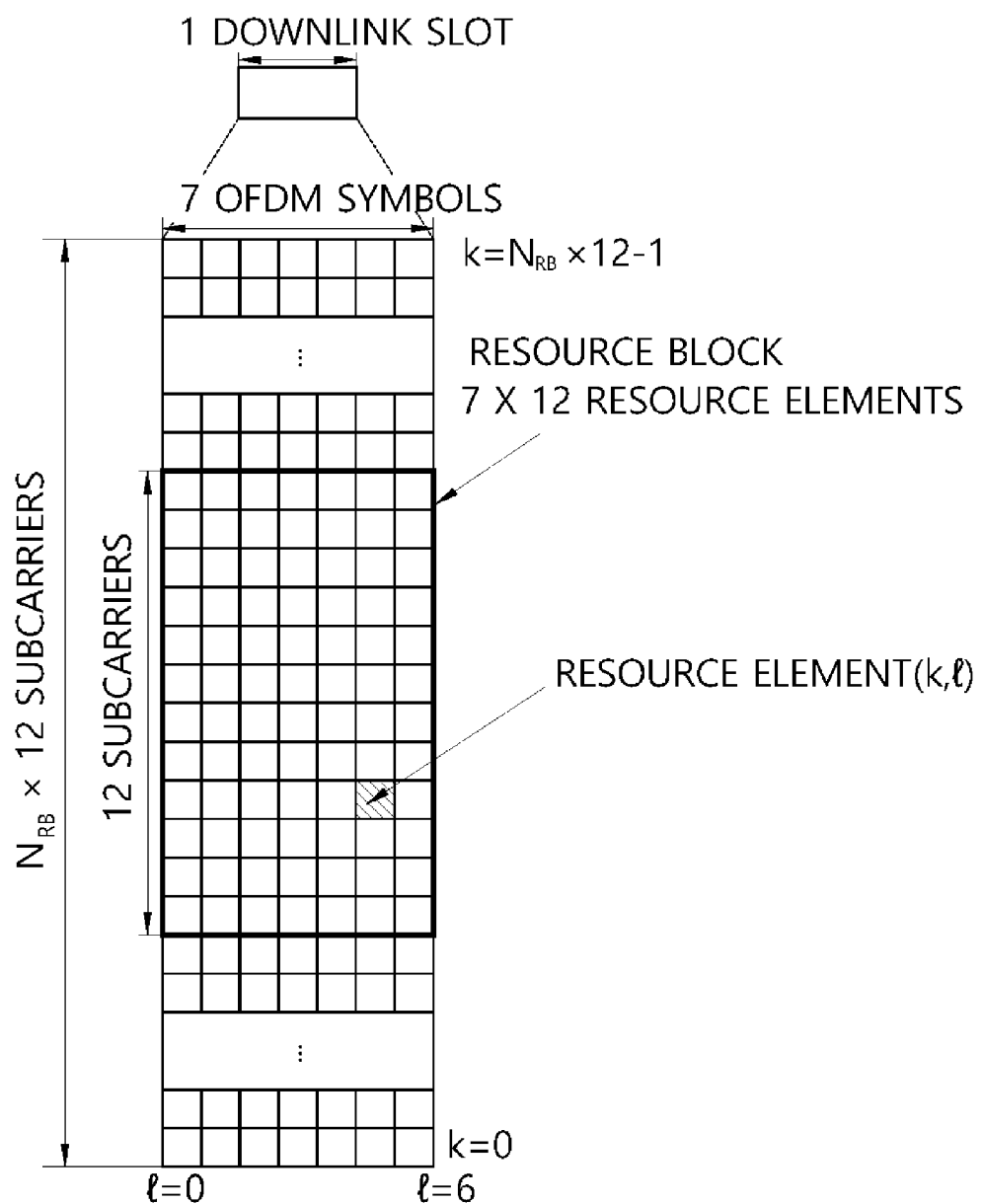
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
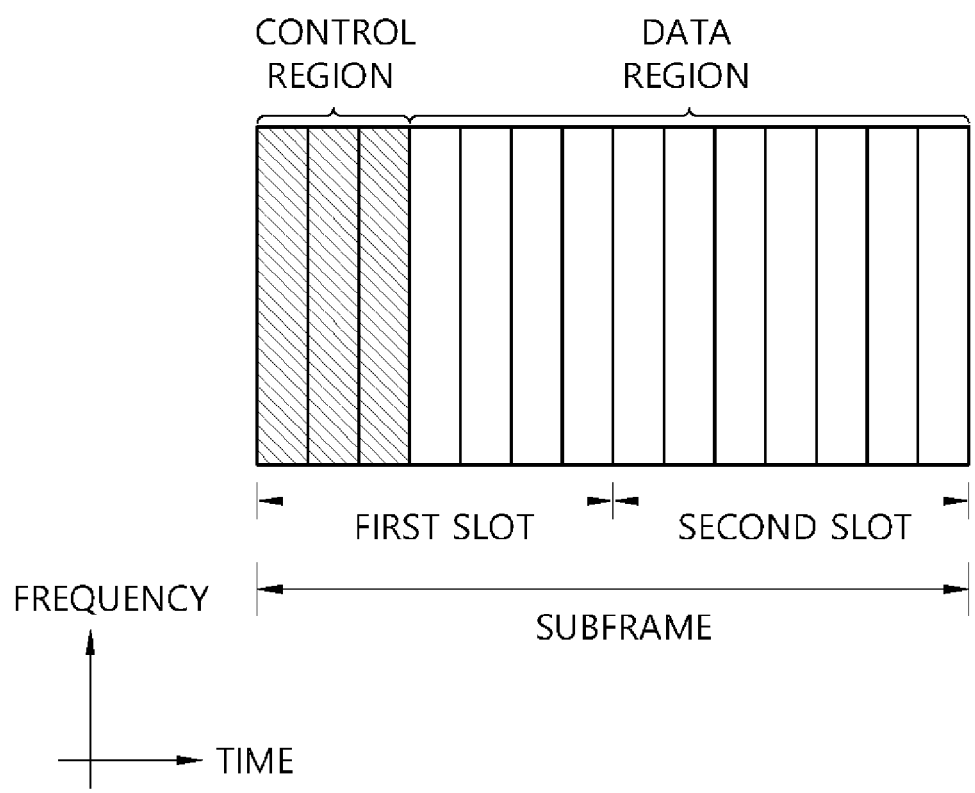
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
|  | DCI format 1 | Terminal specific | Single antenna port, port 0 |
| Transmission mode 2 | DCI format 1A | Public service and terminal specific | Transmit diversity |
|  | DCI format 1 | Terminal specific | Transmit diversity |
| Transmission mode 3 | DCI format 1A | Public service and terminal specific | Transmit diversity |
|  | DCI format 2A | Terminal specific | CDD(Cyclic Delay Diversity) or transmit diversity |
| Transmission mode 4 | DCI format 1A | Public service and | Transmit diversity |

TABLE 2-continued

| Transmission mode | DCI format | Search space | Transmission mode of PDSCH according to PDCCH |
|---|---|---|---|
| | DCI format 2 | terminal specific Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, a DCI format 0 will be described with reference to section 5.3.3.1.1 of 3GPP TS 36.212 V10.2.0 (2011-06). The DCI format 0 includes a field as listed in a following table.

TABLE 4

| Field | Bit number |
|---|---|
| Carrier indicator | 0 or 3 bits |
| Flag for format0/format1A differentiation | 1 bit |
| FH (Frequency hopping) flag | 1 bit |
| Resource block allocation and hopping resource allocation | |
| MCS(Modulation and coding scheme) and RV (redundancy version) | 5 bits |
| NDI (New data indicator) | 1 bit |
| TPC | 2 bits |
| Cyclic shift for DM RS and OCC index | 3 bit |
| UL index | 2 bits |
| DAI (Downlink Allocation Index) | 2 bits |
| CSI request | 1 or 2 bits |
| SRS request | 0 or 1 bit |
| Resource allocation type | 1 bit |

In the above table, the redundancy version (RV) is used for the HARQ operation that will be described below. The redundancy version (RV) field may include any one of 1, 2, 3 and 4. 1, 2, 3 and 4 are repeatedly used in circular manner.

The uplink channels include a PUSCH, a PUCCH, an SRS (Sounding Reference Signal), and a PRACH (physical random access channel).

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

A carrier aggregation system is now described.

Figure 7:
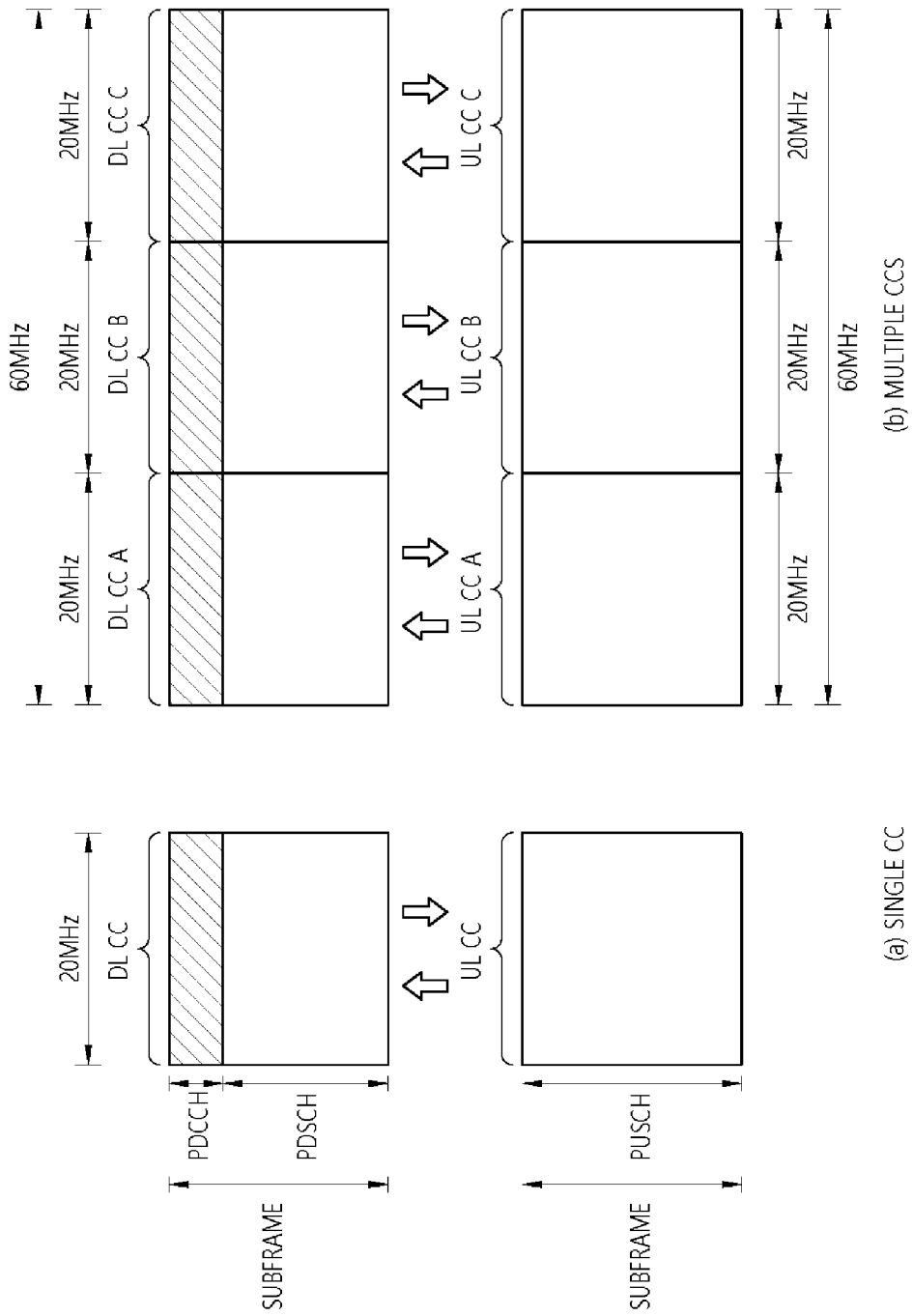
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
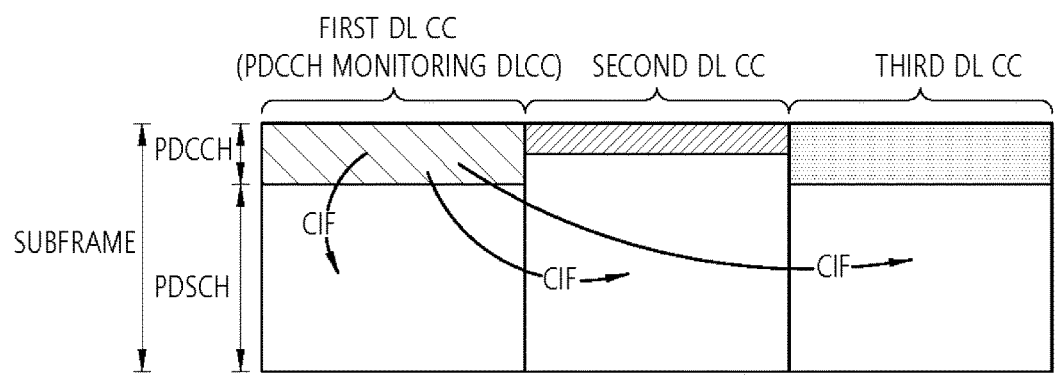
FIG. 8 exemplifies cross-carrier scheduling in the carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

<HARQ (Hybrid Automatic Repeat Request)>

In 3GPP LTE system, a synchronous HARQ is used for uplink transmission, and an asynchronous HARQ is used for downlink transmission. The synchronous HARQ is characterized that retransmission timing is fixed, and the asynchronous HARQ is characterized that retransmission timing is not fixed. That is, by using the synchronous HARQ, an initial transmission and the retransmission are performed in a HARQ cycle.

Figure 9:
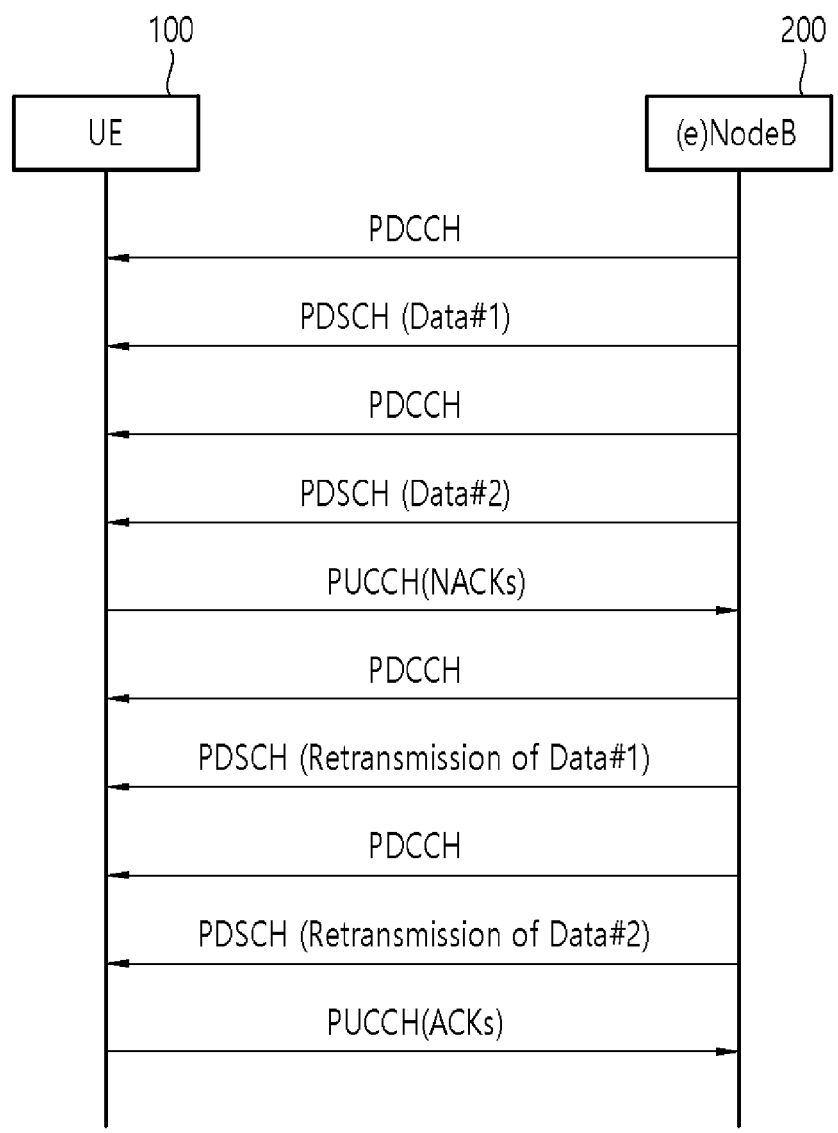
FIG. 9 exemplifies a HARQ operation between a BS and a UE.

FIG. 9 exemplifies a HARQ operation between a BS and a UE.

First, a BS, that is, an eNodeB 200 transmits scheduling information through the physical downlink control channel (PDCCH) control channel in order to transmit data to a terminal, that is, a UE 100 in the HARQ scheme.

The UE 100 checks the incoming scheduling information by monitoring the control channel, that is, the PDCCH.

When it is detected that there is incoming system information by checking the scheduling information, the UE 100 receives data #1 from the eNodeB 200 through the physical shared channel (PSCH) on the timing related to the PDCCH.

Similarly, the UE 100 receives data #2 from the eNodeB 200 according to the scheduling information of the PDCCH.

When receiving data, the UE 100 tries to decode the data. The UE transmits a HARQ feedback to the eNodeB 200 according to the result of decoding. That is, the UE 100 transmits ACK signal if decoding is successful, and transmits NACK signal if decoding is failed, to the eNodeB 200 through the PUCCH or the PUSCH.

When the eNodeB 200 receives the ACK signal, the eNodeB 200 detects that the data transmission is successful and transmits the next data.

However, when the eNodeB 200 receives the NACK signal, the eNodeB 200 detects that the data transmission is failed and retransmits the same data in the same form or a new form.

The UE 100 that receives the NACK signal receives the PDCCH, and tries to receive the data which is retransmitted from the eNodeB 200 according to the scheduling information of the PDCCH.

At the moment, the PDCCH may include the DCI shown in Table 4 as an example. In the DCI, the redundancy field may be included. As described above, the redundancy field may include any one of 0, 2, 3 and 1.

When receiving the retransmitted data, the UE 100 tries to decode the data again by combining with the data stored in a buffer as it is when failing of decoding in various ways, and transmits the ACK signal if decoding is successful and transmits the NACK signal if decoding is failed to the eNodeB 200 through the PUCCH or the PUSCH. The UE 100 repeat the process of transmitting the NACK signal and receives the retransmission until decoding of data is successful.

Figure 10:
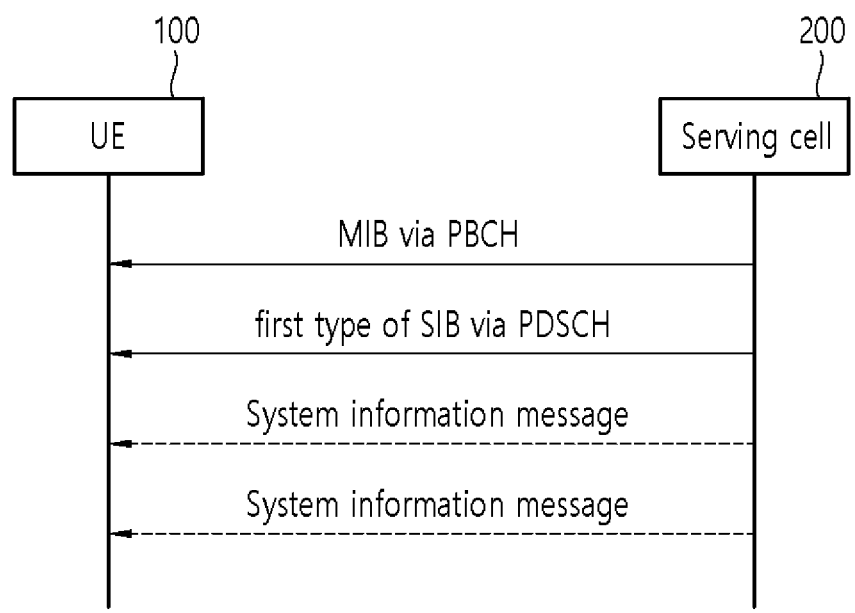
FIG. 10 illustrates an example of a transmission of system information.

FIG. 10 illustrates an example of a transmission of system information.

The system information is divided by a master information block (MIB) and a plurality of system information blocks (SIBs). The MIB includes the physical layer information which is the most important in a cell. The SIB has many types. The SIB of a first type (SIB type 1) includes information used for verifying whether a UE is allowed to access a cell, and includes scheduling information of SIB of other types. The SIB of a second type (SIB type 2) includes common and shared channel information. The SIB of a third type (SIB type 3) includes cell reselection information mainly related to a serving cell. The SIB of a fourth type (SIB type 4) includes frequency information of a serving cell and intra frequency information of a neighbor cell related to the cell reselection. The SIB of a fifth type (SIB type 5) includes information on other E-UTRA frequency and information on inter frequency of a neighbor cell related to the cell reselection. The SIB of the sixth type (SIB type 6) includes information on UTRA frequency and information on UTRA neighbor cell related to the cell reselection. The SIB of the seventh type (SIB type 7) includes information on GERAN frequency related to the cell reselection.

As we can know by referring to FIG. 10, the MIB is delivered to a UE 10 on the PBCH. In addition, the MIB is delivered to the UE 10 by being mapped to the SIB of the first type (SIB type 1) DL-SCH. SIBS of other types are delivered to the UE on the PDSCH through a system information message.

Meanwhile, the MTC will be described below.

Figure 11A:
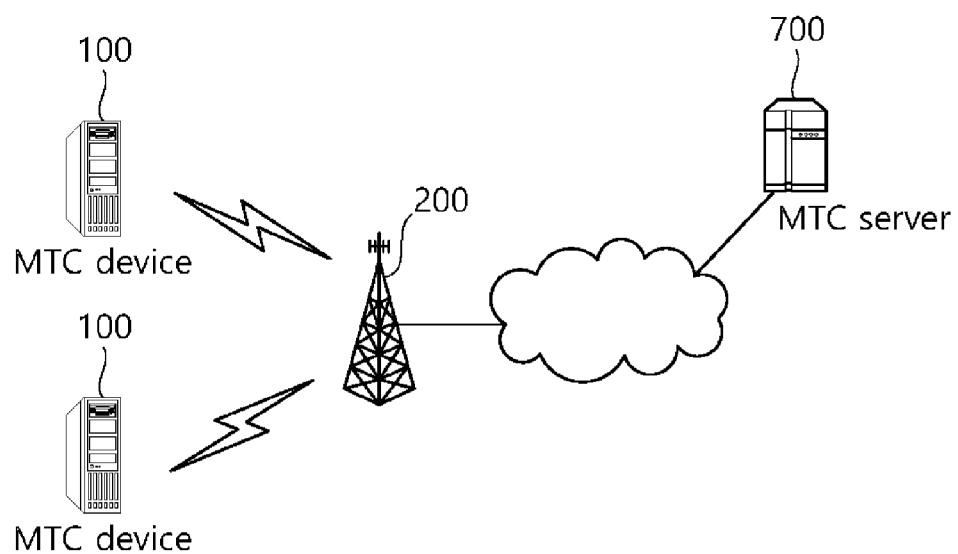
FIG. 11a illustrates an example of a machine type communication (MTC).

FIG. 11a illustrates an example of a machine type communication (MTC).

The machine type communication (MTC) refers to information exchange among MTC devices 100 that human interaction is not accompanied through a BS 200 or information exchange between the MTC device 100 and an MTC server 700 through the BS 200.

The MTC server 700 is an entity that communicates with the MTC device 100. The MTC server 700 executes MTC applications and provides MTC-specific services to the MTC device.

The MTC device is a wireless device that provides MTC communication, and may be fixed or mobile.

The services provided by the MTC are different from the services in the convention communication in which human is involved, and may include various kinds of services including tracking, metering, payment, medical service, remote control, and the like. In more particularly, the services provided by the MTC may include meter check, measuring water level, application of surveillance camera, stock report of vending machine, and so on.

In the MTC device, amount of transmission data is small and uplink/downlink data transmission/reception occurs sometimes. Accordingly, the peculiarity of MTC device is that it is efficient to decrease unit price of a MTC device and decrease battery power consumption with being adjusted to the low data transmission rate. Such an MTC device is characterized by low mobility, and accordingly, has characteristic that a channel environment is hardly changed.

Figure 11B:
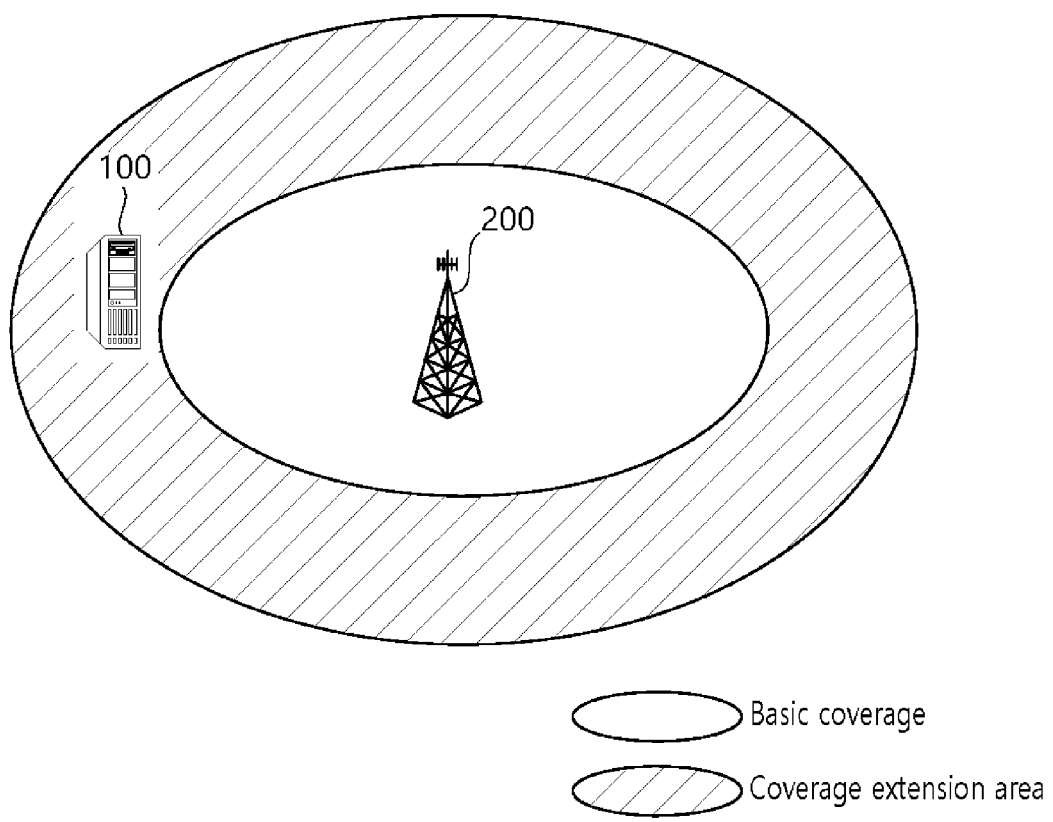
FIG. 11b exemplifies a cell coverage extension for an MTC device.

FIG. 11b exemplifies a cell coverage extension for an MTC device.

Recently, it has been considered to extend the cell coverage of BS for an MTC device 100, and various techniques for the cell coverage extension are discussed.

However, in case that coverage of cell is extended, if a BS transmits the PDCCH that includes a PDSCH and the scheduling information of the PDSCH to the MTC device located in the coverage extension area, like the BS transmits to a normal UE, the MTC device has difficulty in receiving them.

<Disclosures of the Present Specification>

Accordingly, disclosures of the present specification are with the purpose of proposing a way to solve the above problems.

In order to solve the problems above described, according to a disclosure of the present specification, in case that a BS transmits a PDSCH and a PDCCH to an MTC device 100 located in a coverage extension area, it is implemented that the BS repeatedly transmit the PDSCH and the PDCCH on several subframes (e.g., bundle subframe). Accordingly, the MTC device receives a bundle of PDCCHs through several subframes and decodes the bundle of PDCCHs, thereby increasing success rate of decoding. That is, by using a part or the whole of the bundles of PDCCHs received through several subframes, the PDCCH may be successfully decoded. Similarly, the MTC device receives a bundle of PDSCHs through several subframes and decodes the bundle of PDSCHs, thereby increasing success rate of decoding.

Meanwhile, the MTC device located in the coverage extension area may transmit a bundle of PUCCHs through several subframes. Similarly, the MTC device may transmit a bundle of PUSCHs through several subframes.

However, in case that the BS receives HARQ NACK from the MTC device 100 although the BS transmits the bundle of repeated PDSCHs to the MTC device 100, there is a problem that a problem of subsequent HARQ operation of the BS is not technically solved. In addition, in case that the MTC device 100 receives HARQ NACK from the BS although the MTC device 100 transmits the bundle of repeated PUSCHs to the BS, there is a problem that a problem of subsequent HARQ operation of the MTC device 100 is not technically solved.

Accordingly, techniques for solving such problems will be described below.

A. Repeated bundle transmission and HARQ retransmission

In order to solve the problems above described, according to a disclosure of the present specification, in case that a BS receives HARQ NACK from an MTC device although the BS transmits a bundle of repeated PDSCHs to the MTC device, the BS may retransmit the bundle of repeated PDSCH to the MTC device. Hereinafter, this will be described by reference to FIG. 12.

Figure 12:
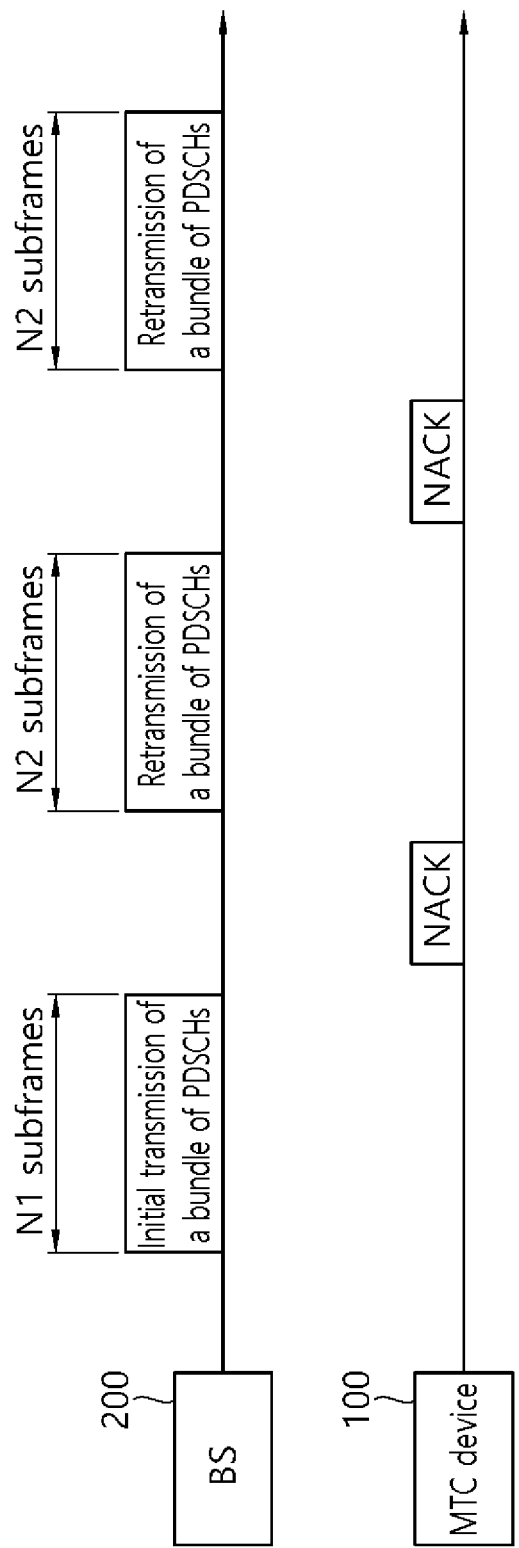
FIG. 12 illustrates an example of a HARQ operation according to a disclosure of the present specification.

FIG. 12 illustrates an example of a HARQ operation according to a disclosure of the present specification.

As shown in FIG. 12, in case that a BS 200 receives HARQ NACK from an MTC device 100 although the BS 200 transmits a bundle of repeated PDSCHs to the MTC device 100 initially, the BS 200 may retransmit the bundle of repeated PDSCHs to the MTC device 100. At the moment, HARQ ACK/NACK may also be transmitted as a repeated bundle.

Similarly, the MTC device 100 receives HARQ NACK from the BS 200 although the MTC device 200 transmits a bundle of repeated PUSCHs to the BS 200, the MTC device 100 may retransmit the bundle of repeated PUSCHs to the BS 200.

Figure 13A:
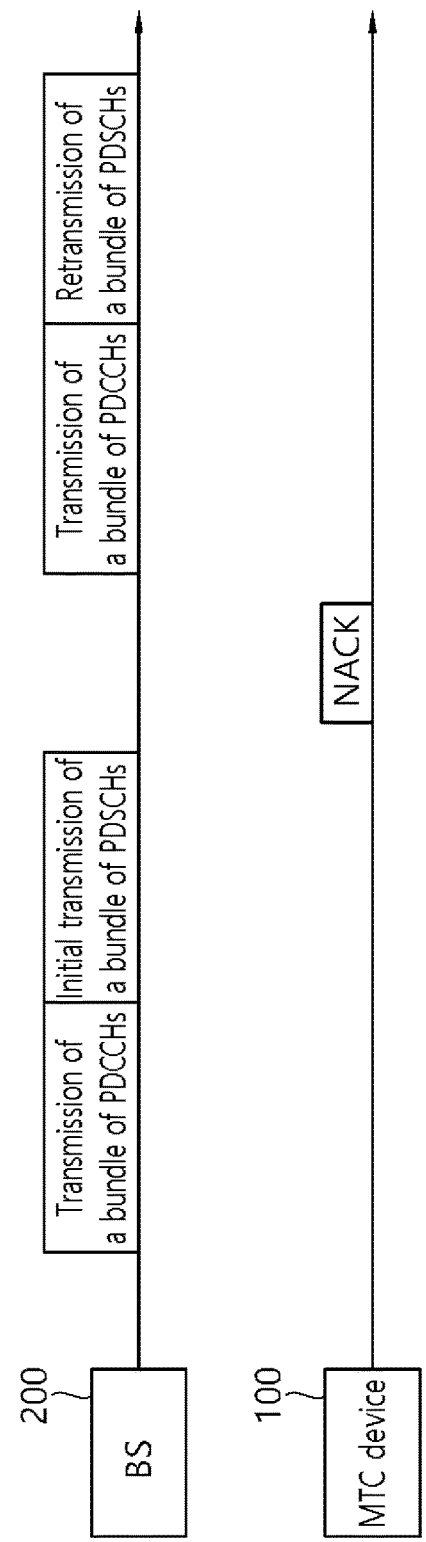
FIG. 13a and FIG. 13b illustrate another example of a HARQ operation according to a disclosure of the present specification.
Figure 13B:
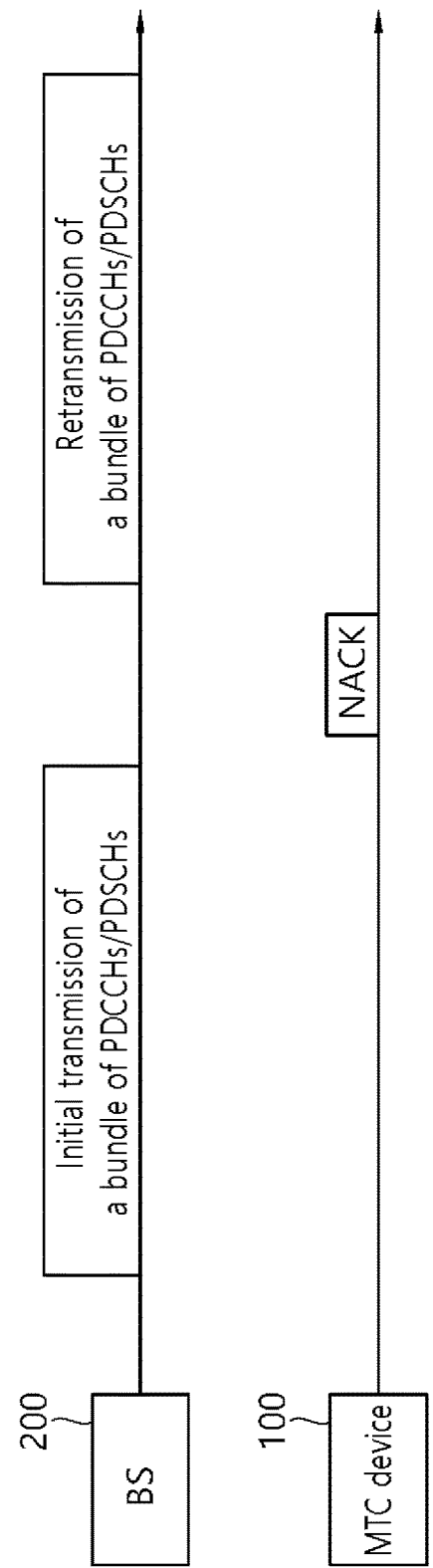

FIG. 13a and FIG. 13b illustrate another example of a HARQ operation according to a disclosure of the present specification.

The PDDCH that includes the scheduling information on a bundle of PDSCHs may also be transmitted as a repeated bundle. At the moment, as we can know by reference to FIG. 13a, after the bundle of PDCCHs is transmitted, the bundle of PDSCH may be transmitted. Or, as we can know by reference to FIG. 13b, the PDCCH and the PDSCH may be repeatedly transmitted by being bundled together.

If NACK is received from the MTC device 100 in response to the bundle of PDSCH, the BS 200 may retransmit the bundle of PDCCHs and the bundle of PDSCHs.

As such, it may become a problem how to apply a redundancy version (RV) value to the bundle of PDSCHs and the bundle of PUSCH that are retransmitted according to the HARQ. Accordingly, this will be described below.

B. A value of redundancy version (RV) in retransmission

In order to solve the problems described above, according to an embodiment, it may be implemented that a value of redundancy version (RV) is the same of different for each bundle of PDSCHs which is retransmitted.

Figure 14A:
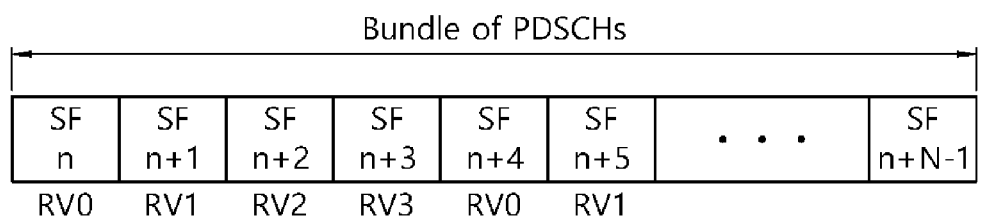
FIG. 14a and FIG. 14b illustrate examples of changing RV value for a bundle of PDSCHs according to a disclosure of the present specification.
Figure 14B:
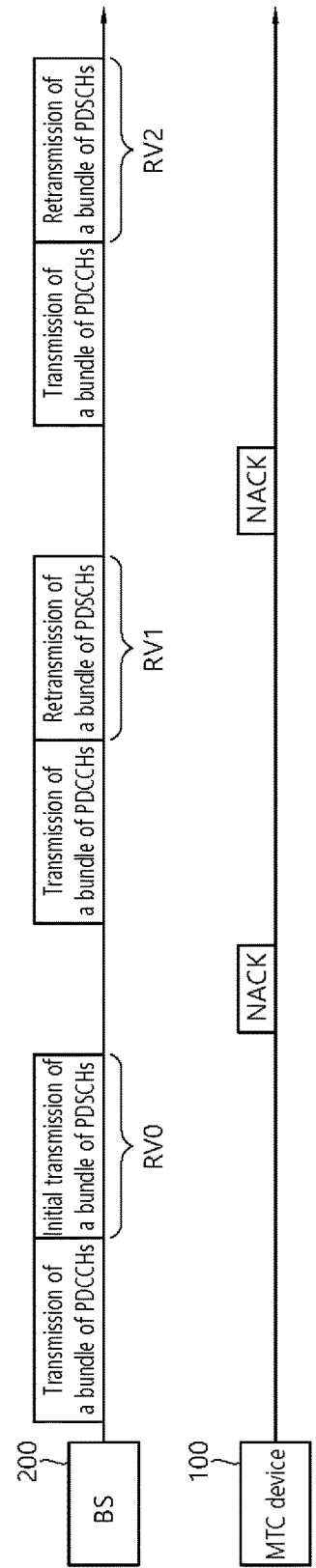

FIG. 14a and FIG. 14b illustrate examples of changing RV value for a bundle of PDSCHs according to a disclosure of the present specification.

First, referring to FIG. 14a, in case that a bundle of PDSCHs is transmitted on subframe n to subframe n+N−1, that is, on N number of subframes, a UE may assume that different RV values are used for each subframe. That is, RV0, RV1, RV2 and RV3 are applied as a cyclic shift for each subframe. At the moment, it may be that RV0=0, RV1=2, RV2=3 and RV3=1. Or, in case that a bundle of PDSCHs is transmitted on N number of subframes, RV0 may be applied for the RV value to the PDSCHs on the first N/4 number of subframes, and RV1 may be applied for the RV value to the PDSCHs on the next N/4 number of subframes. Similarly, RV2 may be applied for the RV value to the PDSCHs on the next N/4 number of subframes, and RV3 may be applied for the RV value to the PDSCHs on the remaining N/4 number of subframes. At the moment, it may be that RV0=0, RV1=2, RV2=3 and RV3=1.

Meanwhile, in case that a bundle of PDSCHs is transmitted in response to HARQ, the scheme/pattern to which the RV values are applied for each PDSCH in the bundle of PDSCHs may be maintained to be the same within the bundle of PDSCHs.

Meanwhile, as we can know by reference to FIG. 14b, an identical RV value may be applied within one PDSCH bundle. And different RV values may be applied to each PDSCH bundle. For example, in PDSCH bundle 0, only RV0 may be used as a RV value, and in PDSCH bundle 1, only RV1 may be used. At the moment, RV0, RV1, RV2 and RV3 may be used as a cyclic shift for each of the PDSCH bundles. For example, in PDSCH bundle n, the RV value that corresponds to (n mode 4)th order. At the moment, it may have the values, RV0=0, RV1=2, RV2=3 and RV3=1.

Here, a RV value that is used by one PDSCH bundle may be notified to an MTC device through DCI. For example, when notifying one RV value to the MTC device through the RV field of PDCCH, the corresponding RV value may be continuously applied within the PDSCH bundle that the corresponding PDCCH schedules.

Or, when the RV value is applied within PDSCH bundle 0 that is initially transmitted PDSCH bundle in an order of RV0, RV1, RV2 and RV3 (at the moment, RV0=0, RV1=2, RV2=3 and RV3=1) for each subframe, different order from PDSCH bundle 0 may be applied to PDSCH bundle 1 such as the RV value which is applied for each subframe is in an order of RV1, RV2, RV3 and RV0. That is, within one PDSCH bundle, RV0, RV1, RV2 and RV3 are repeatedly applied as a cycle shift for each subframe as the RV value, but the RV value applied to the first subframe within the PDSCH bundle (the first value among the RV values that are applied within the bundle) may be different for each PDSCH bundle. For this, a starting value of the RV values used within the PDSCH bundle may be predetermined. For example, to PDSCH bundle n, the RV value may be repeatedly applied as cycle shift from the RV value that corresponds to (n mod 4)th order. Or, in this case, the RV starting value that is to be applied to each PDSCH bundle may be determined by the PDCCH that schedules the corresponding PDSCH bundle. A BS may notify a starting value of RV that is to be applied within PDSCH bundle through DCI to an MTC device through, for example, the redundancy value (RV) field.

Or, by determine several patterns of RV value applied within the PDSCH bundle, a BS may notify which pattern is applied to each PDSCH bundle among the corresponding patterns to an MTC device through the PDCCH.

Figure 15A:
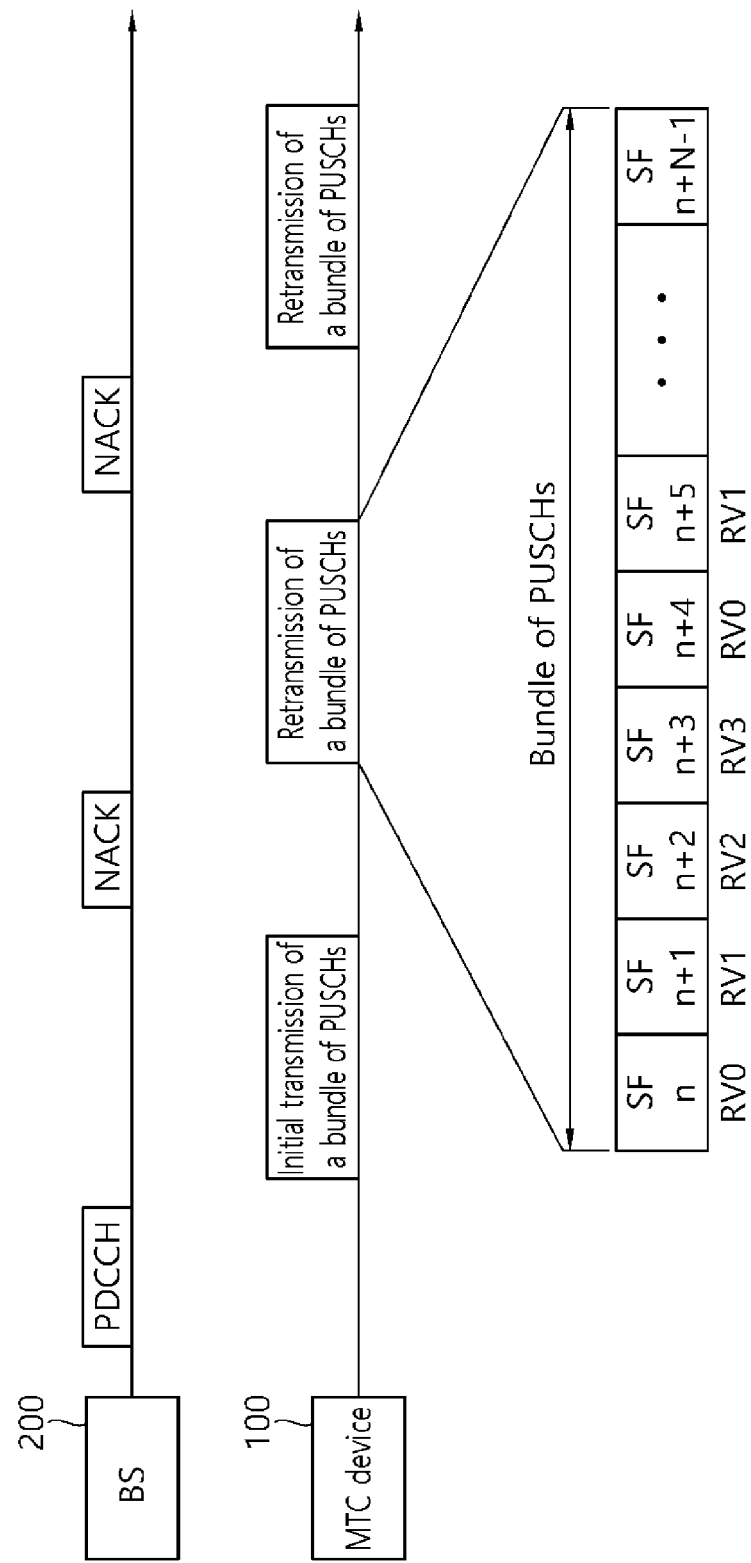
FIG. 15a and FIG. 15b illustrate examples of changing RV value for a bundle of PDSCHs according to another disclosure of the present specification.
Figure 15B:
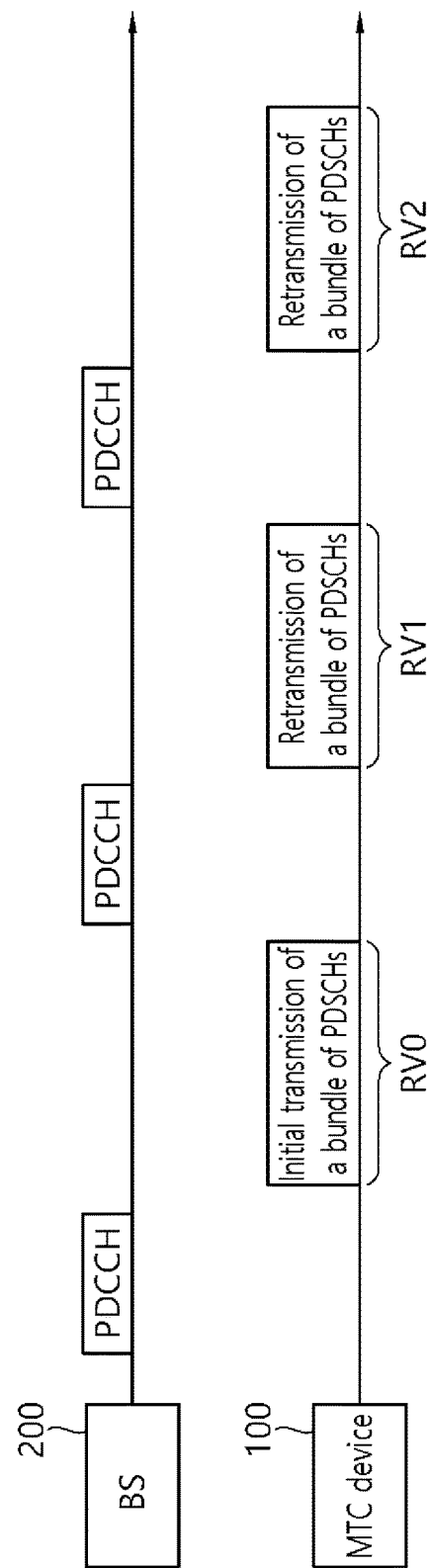

FIG. 15a and FIG. 15b illustrate examples of changing RV value for a bundle of PDSCHs according to another disclosure of the present specification.

As we can know by reference to FIG. 15a, in case that an MTC device 100 receives a PDCCH that includes uplink grant, the MTC device 100 may transmit a bundle of PUSCHs to a BS 200 on several subframes. In case that NACK is received from the BS 200, the MTC device 100 may retransmit the bundle of PUSCHs. At the moment, if the bundle of PUSCHs is transmitted on subframe n to subframe n+N−1, that is on n number of subframes, RV0, RV1, RV2 and RV3 may be repeatedly used as cycle shift as a RV value for each subframe. Since this is similar to the description by reference to FIG. 14a, the description above will be applied.

Meanwhile, as we can know by reference to FIG. 15b, in case that an MTC device 100 receives a PDCCH that includes uplink grant, the MTC device 100 may transmit a bundle of PUSCHs to a BS 200 on several subframes. By transmitting the PDCCH, not NACK, the BS 200 may request a retransmission to a UE. At the moment, in case that the MTC device 100 retransmits the bundle of PUSCHs, an identical RV value may be applied within one PDSCH bundle. And different RV values may be applied to each PDSCH bundle. Since this is similar to the description by reference to FIG. 14b, the description above will be applied.

C. Determining number of repetition within bundle in retransmission

In case of retransmitting a bundle of PDSCHs or a bundle of PUSCHs which is retransmitted in response to HARQ, it may be implemented that a number of PDSCH/PUSCH (i.e., a number of subframes) being repeated within the retransmitted bundle is the same as or different from the repletion count of PDSCH/PUSCH within each bundle which is initially transmitted. Hereinafter, this will be described by reference to drawings.

Figure 16A:
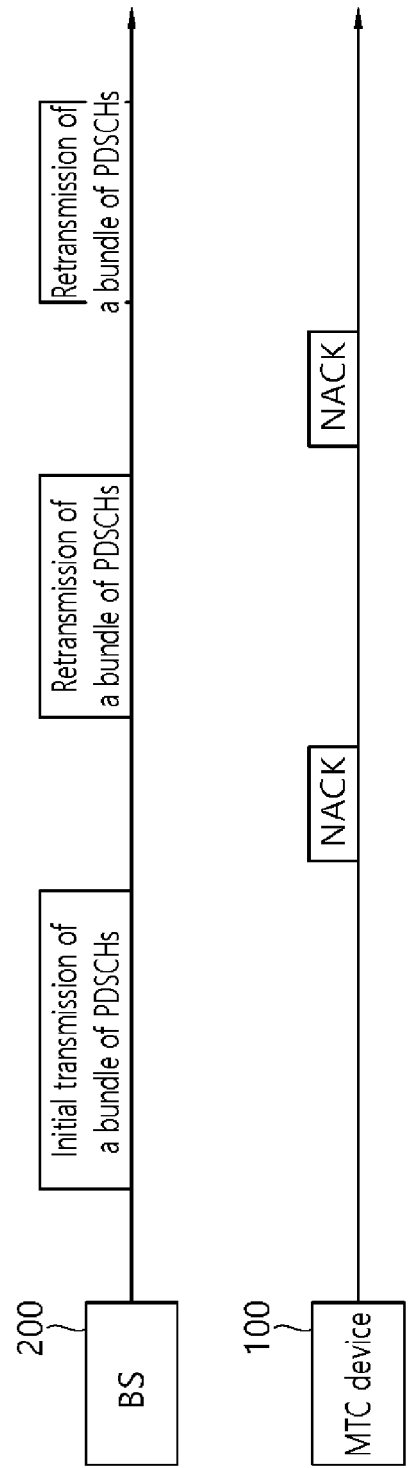
FIG. 16a and FIG. 16b illustrate a HARQ operation according to another disclosure of the present specification.
Figure 16B:
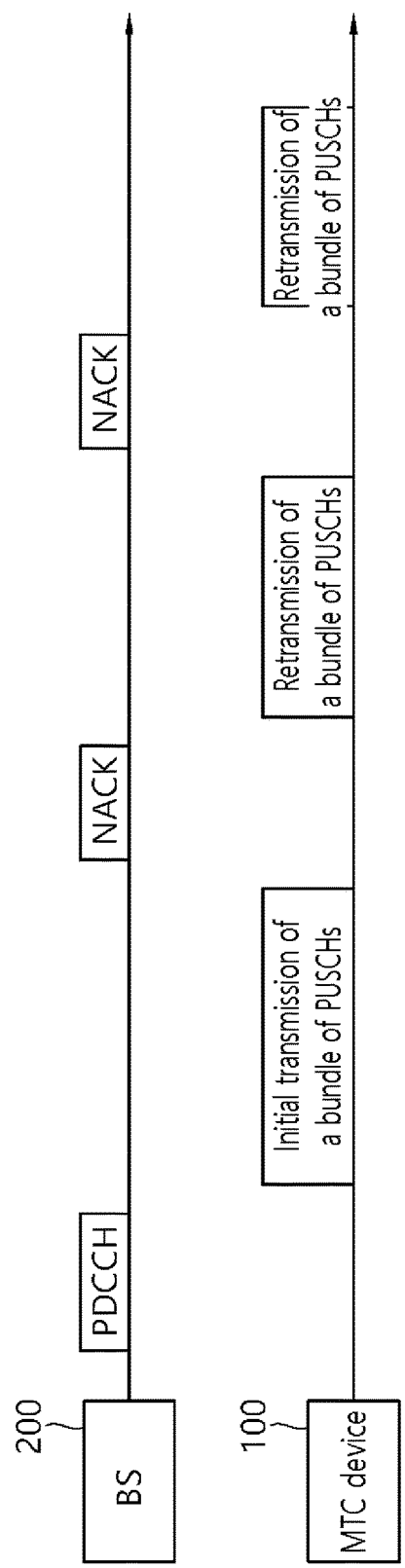

FIG. 16a and FIG. 16b illustrate a HARQ operation according to another disclosure of the present specification.

As we can know by reference to FIG. 16a, in case that an MTC device 100 transmits HARQ NACK in response to a bundle of PDSCHs which is initially transmitted by a BS 200, the BS 200 may configure the repetition count of PDSCH within a bundle of PDSCHs that will be retransmitted (i.e., a number of subframes on which identical PDSCHs are repeatedly transmitted) to be less than the repetition count of PDSCH within a bundle of PDSCHs which is initially transmitted. According to this, the repetition count may be changed whenever the retransmission is performed.

Similarly, as we can know by reference to FIG. 16b, the repetition count of PUSCH within a bundle of PUSCHs that will be retransmitted may be less than the repetition count of PUSCH within a bundle of PUSCHs which is initially transmitted.

Hereinafter, a way of determining the repetition count whenever performing the retransmission will be described. However, although it will be described based on a PDSCH mainly for the convenience of description, the description below may also be applied to a PUSCH.

(i) Whenever performing retransmission, the repetition count of a PDSCH is changed according to a predetermined pattern.

The repetition count of PUSCH (i.e., a number of subframes on which the PUSCH is repeatedly transmitted) within a bundle of PUSCHs that will be retransmitted may be a half of the repetition count of PUSCH within a bundle of PUSCHs which is initially transmitted. That is, if eight PUSCHs are repeated in the bundle of PUSCHs which is initially transmitted, four PUSCHs may be repeated in the bundle of PUSCHs which is retransmitted.

Meanwhile, the count that the PDSCH is repeated may be decreased less than a half whenever retransmitting the bundle of PDSCHs. For example, if the PDSCH is repeated on N subframes in PDSCH bundle 0, the PDSCH may be repeated on N/2 subframes in PDSCH bundle 1. Similarly, the PDSCH may be repeated on N/(n+1) subframes in PDSCH bundle n. That is, if eight PDSCHs are repeated in the bundle of PDSCHs previously transmitted, four PDSCHs may be repeated in the bundle of PDSCHs which is retransmitted, and two PDSCHs may be repeated in the bundle of PDSCHs in the next transmission.

(ii) A BS delivers an indication that represents a count of PDSCH being repeated within a bundle of PDSCHs which is retransmitted.

A BS may deliver information that represents a count that the PDSCH is repeated within a bundle of PDSCHs which is retransmitted (i.e., a number of subframes or a time section on which the PDSCH is repeatedly transmitted) to an MTC device through a PDCCH. For example, the information that represents the repetition count may be delivered to an MTC device through the explicit field of DCI.

According to an embodiment, the information that represents the count of PDSCH being repeated may be included in a modulation and coding scheme (MCS) field of the PDCCH. A specific value among the values in the MCS field may express the count of PDSCH being repeated. Or, the specific value among the values in the MCS field may express a relative repetition count in comparison with a count of PDSCH being repeated within previous bundle of PDSCHs. For example, a specific MCS index may represent the count of PDSCH being repeated within previous bundle of PDSCHs to be used for retransmission of the same repetition count, and other MCS index may represent the count of PDSCH being repeated within previous bundle of PDSCHs to be used for retransmission of 1/2 repetition count. Or, the specific values in a specific MCS field may express a relative repetition count in comparison with a count of PDSCH being repeated within a first bundle of PDSCHs. For example, a specific MCS index may represent the count of PDSCH being repeated within the first bundle of PDSCHs to be used for retransmission of the same repetition count, and other MCS field may represent the count of PDSCH being repeated within the first bundle of PDSCHs to be used for retransmission of 1/2 repetition count.

According to another embodiment, the information that represents the count of PDSCH being repeated may be included in the RV field in the PDCCH. For example, each value of the RV field is matched to repetition counts different from each other. When a value of the RV field is determined, the MTC device may acquire the repetition count within the bundle of PDSCHs. For another example, each value of the RV field may represent a relative repetition count in comparison with a count of PDSCH being repeated within previous bundle of PDSCHs. As a more particular example, when a value of the RV field is 0, which may represent the count of PDSCH being repeated within previous bundle of PDSCHs to be used for retransmission of the same repetition count. Or, when a value of the RV field is 1, which may represent the count of PDSCH being repeated within previous PDSCH bundle to be used for retransmission of ½ repetition count.

Or, each value of the RV field may represent a relative repetition count in comparison with a count of PDSCH being repeated within the first bundle of PDSCHs. As a particular example, when a value of the RV field is 0, which may represent the count of PDSCH being repeated within PDSCH bundle 0 to be used for retransmission of the same repetition count. And when a value of the RV field is 1, which may represent the count of PDSCH being repeated within PDSCH bundle 0 to be used for retransmission of ½ repetition count.

Figure 17A:
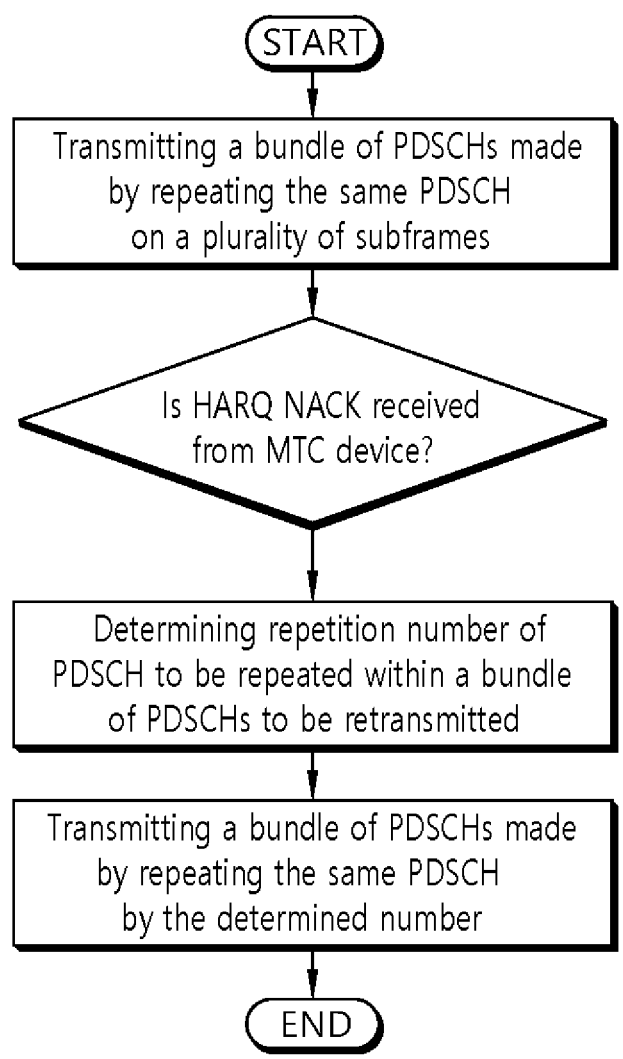
FIG. 17a is a flowchart illustrating a HARQ operation of FIG. 16a, and FIG. 17b is a flowchart illustrating a HARQ operation of FIG. 16b.
Figure 17B:
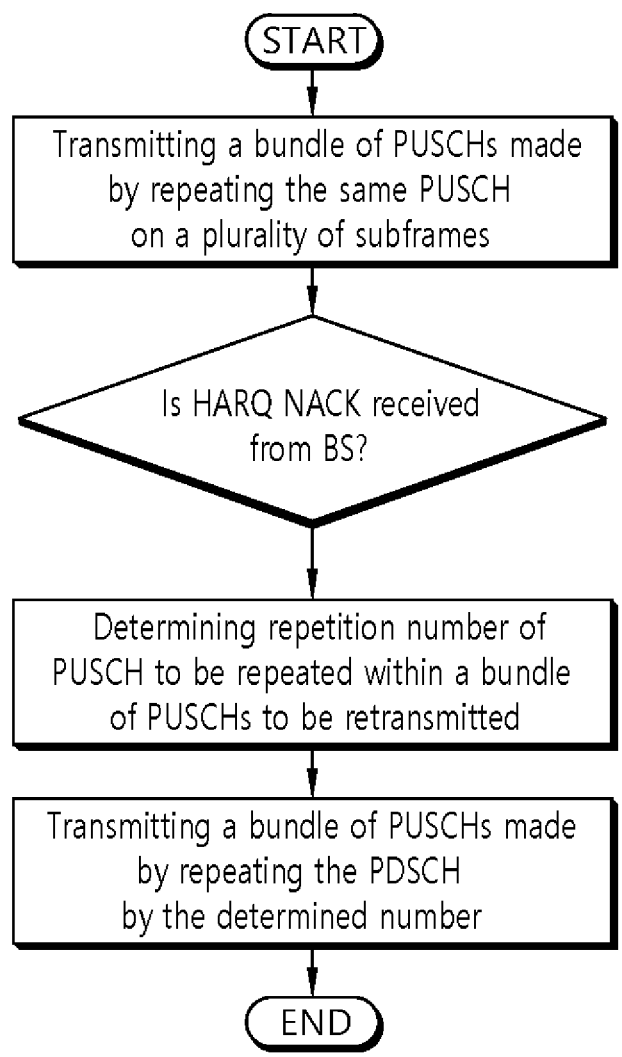

FIG. 17a is a flowchart illustrating a HARQ operation of FIG. 16a, and FIG. 17b is a flowchart illustrating a HARQ operation of FIG. 16b.

Referring to FIG. 17a, a BS initially transmits a bundle of PDSCHs made by identical downlink data, that is, PDSCHs being repeated on a plurality of downlink subframes to an MTC device.

However, in case that HARQ NACK is received from the MTC device, the BS determines a number of the same PDSCHs being repeated in the bundle of PDSCHs which is going to be retransmitted. In other words, the BS determines a number of subframes on which the same PDSCHs is to be repeated.

Subsequently, the BS retransmits the bundle of PDSCHs made by PDSCHs being repeated as much as the determined number.

Similarly, referring to FIG. 17b, an MTC device initially transmits a bundle of PUSCHs made by identical uplink data, that is, PUSCHs being repeated on a plurality of subframes to a BS.

However, in case that HARQ NACK is received from the BS, the MTC device determines a number of the same PUSCHs being repeated in the bundle of PUSCHs which is going to be retransmitted. In other words, the MTC device determines a number of subframes on which the same PUSCHs is to be repeated.

Subsequently, the MTC device retransmits the bundle of PUSCHs made by PUSCHs being repeated as much as the determined number.

The embodiments of the present invention described so far may be implemented through various means. For example, the embodiments of the present invention may be implemented by hardware, firmware, software or the combination thereof. Particularly, this will be described by reference to drawing.

Figure 18:
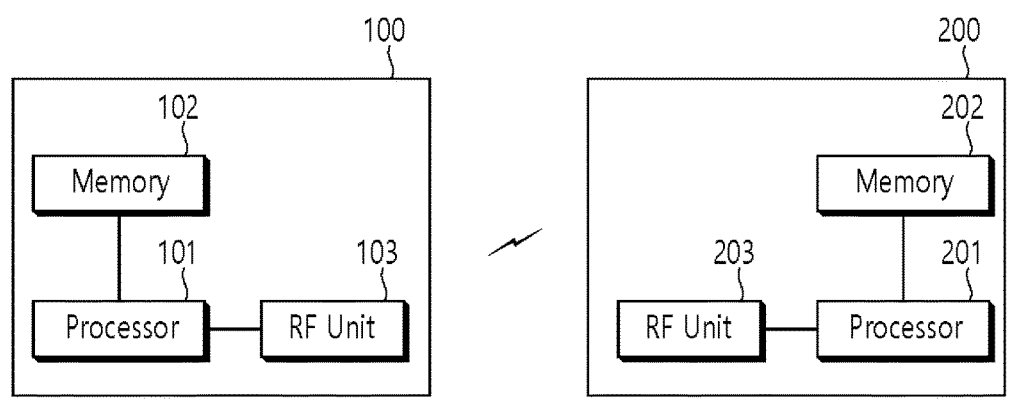
FIG. 18 is a block diagram illustrating a wireless communication system in which a disclosure of the present specification is implemented.

FIG. 18 is a block diagram illustrating a wireless communication system in which a disclosure of the present specification is implemented.

A BS 200 includes a processor 201, a memory 202, and an RF (radio frequency) unit (the MTC device) 203. The memory 202 which is coupled to the processor 201 stores a variety of information for driving the processor 201. The RF unit 203 which is coupled to the processor 201 transmits and/or receives a radio signal. The processor 201 implements the proposed functions, procedure, and/or methods. In the embodiments described above, the operation of BS may be implemented by the processor 201.

An MTC device 100 includes a processor 101, a memory 102, and an RF (radio frequency) unit 103. The memory 102 which is coupled to the processor 101 stores a variety of information for driving the processor 101. The RF unit 103 which is coupled to the processor 101 transmits and/or receives a radio signal. The processor 101 implements the proposed functions, procedure, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:
1. A method for transmitting uplink data, the method performed by a machine type communication (MTC) device and comprising:
transmitting initially a bundle of repeated physical uplink shared channels (PUSCHs) including same uplink data to a base station on a plurality of uplink subframes;

receiving a hybrid automatic repeat request (HARQ) response signal from the base station in response to the bundle of repeated PUSCHs;

receiving an indication of a physical downlink shared channel (PDSCH) repetition number from the base station;

determining a repetition number of a PUSCH including the same uplink data based on the indication, when the HARQ response signal is a negative-acknowledgement (NACK); and retransmitting the bundle of repeated PUSCHs according to the determined repetition number of the PUSCH on the on a plurality of uplink subframes, to the base station, wherein the indication is included in a modulation and coding scheme (MCS) field of a physical downlink control channel (PDCCH).

2. The method of claim 1, wherein the determined repetition number of the PUSCH is different from a number of repeated PUSCHs of the bundle which is initially transmitted.

3. The method of claim 1, wherein the determined repetition number of the PUSCH is less than a number of repeated PUSCHs of the bundle which is initially transmitted.

4. The method of claim 3, wherein the determined repetition number of the PUSCH is decreased by a half whenever the NACK is received.

5. A method for transmitting downlink data, the method performed by a base station and comprising:

transmitting initially a bundle of repeated physical downlink shared channels (PDSCHs) including same downlink data to a machine type communication (MTC) device on a plurality of downlink subframes;

receiving a hybrid automatic repeat request (HARQ) response signal from the MTC device in response to the bundle of repeated PDSCHs;

determining a repetition number of a PDSCH including the same downlink data, when the HARQ response signal is a negative-acknowledgement (NACK);

transmitting an indication of the determined repetition number of the PDSCH to the MTC device; and retransmitting the bundle of repeated PDSCHs according to the determined repetition number of the PDSCH on the plurality of downlink subframes, to the MTC device, wherein the indication is included in a modulation and coding scheme (MCS) field of a physical downlink control channel (PDCCH).

6. The method of claim 5, wherein the determined repetition number of the PDSCH is different from a number of repeated PDSCHs of the bundle which is initially transmitted.

7. The method of claim 5, wherein the determined repetition number of the PDSCH is less than a number of repeated PDSCHs of the bundle which is initially transmitted.

8. The method of claim 7, wherein the determined repetition number of the PDSCH is decreased by a half whenever the NACK is received.

9. A machine type communication (MTC) device, comprising:

a transceiver; and a processor configured to:

control the transceiver to transmit initially a bundle of repeated physical uplink shared channels (PUSCHs) including same uplink data to a base station on a plurality of uplink subframes, and control the transceiver to receive an indication of a physical downlink shared channel (PDSCH) repetition number from the base station, wherein, when the transceiver receives a hybrid automatic repeat request (HARQ) negative-acknowledgement (NACK) from the base station in response to the bundle of repeated PUSCHs, the processor determines a repetition number of a PUSCH including the same uplink data based on the indication, wherein the transceiver retransmits the bundle of repeated PUSCHs according to the determined repetition number on the plurality of uplink subframes, to the base station, and wherein the indication is included in a modulation and coding scheme (MCS) field of a physical downlink control channel (PDCCH).

10. A base station for transmitting downlink data to a machine type communication (MTC) device, the base station comprising:

a transceiver; and a processor configured to:

control the transceiver to transmit initially a bundle of repeated physical downlink shared channels (PDSCHs) including same downlink data to the MTC device on a plurality of downlink subframes, and wherein, when the transceiver receives a hybrid automatic repeat request (HARQ) negative-acknowledgement (NACK) from the MTC device in response to the bundle of repeated PDSCHs, the processor determines a repetition number of a PDSCH including the same downlink data and controls the transceiver to transmit an indication of the determined reception number of the PDSCH to the MTC device, wherein the transceiver retransmits the bundle of repeated PDSCHs according to the determined repetition number of the PDSCH on the plurality of downlink subframes, to the MTC device, and wherein the indication is included in a modulation and coding scheme (MCS) field of a physical downlink control channel (PDCCH).

* * * * *